3,137,589
PRODUCTION OF BONDED FIBER FLEECES

Hans Reinhard, Mannheim, and Ernst Penning, Ludwigshafen (Rhine), Germany, assignors to Badische Anilin- & Soda-Fabrik Aktiengesellschaft, Ludwigshafen (Rhine), Germany
No Drawing. Filed Oct. 30, 1959, Ser. No. 849,750
Claims priority, application Germany Nov. 5, 1958
5 Claims. (Cl. 117—140)

This invention relates to the production of bonded fiber fleeces.

It is known to prepare bonded sheet materials of good mechanical strength from fiber fleeces, i.e., non-woven fibrous masses, with the aid of film-forming polymeric natural or synthetic resins. As the binding agent there are used for example crosslinkable or vulcanizable compounds, such as natural or synthetic rubber. Instead of vulcanizable compounds there are also being used to a great extent thermoplastic polyvinyl compounds, as for example polyvinyl acetate, polyacrylic acid esters, polymethacrylic acid esters or polyvinyl chloride.

The fleeces consolidated with these binding agents exhibit considerable differences however as regards stability to washing liquors and organic solvents. In all cases in which both good stability to hot washing liquors and to organic solvents is required, the known binding agents have not been entirely satisfactory.

We have now found that bonded fiber fleeces having especially good stability to washing liquids and solvents can be prepared by using as the binding agent a copolymer of 1 to 20% by weight of an $\alpha,\beta$-unsaturated carboxylic acid amide substituted on nitrogen by at least one methylol group and 80 to 99% by weight of another unsaturated polymerizable compound and heating the fibrous mass containing the binding agent for a short time at a temperature above about 60° C. The process of the invention can be briefly illustrated by the following flowsheet in which the binding agent is the aforementioned copolymer:

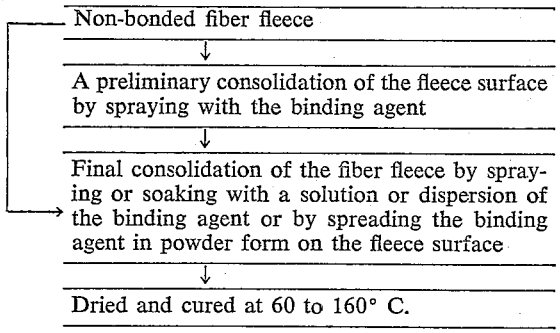

As $\alpha,\beta$-unsaturated carboxylic acid amides substituted on nitrogen by methylol groups there are suitable especially the N-methylolamides of acrylic acid, methacrylic acid or also of maleic acid. These may be copolymerized with ethylenically unsaturated polymerizable monomers, such as acrylic and methacrylic acid esters, vinyl esters, vinyl ethers, styrene, acrylonitrile or olefines or with mixtures of these monomers. The binding agent according to this invention should contain 80 to 99% by weight of one or more of these monomers and 1 to 20% by weight of the $\alpha,\beta$-unsaturated N-methylolamide or amides. It is preferably prepared by polymerization of the mixture of monomers in aqueous emulsion. The copolymers prepared by such emulsion polymerization are obviously water-insoluble.

All kinds of fleeces of natural, synthetic or mineral fibers can be consolidated by means of the said binding agents to form sheet structures of high mechanical strength and very good stability to washing liquids and solvents. Suitable fibrous materials include cotton, staple fiber, rayon, cellulose acetate, wool sisal or highly polymeric synthetic materials, such as polyamides, polyvinyl chloride, polyacrylonitrile, polyterephthalic acid esters, or also mineral fibers, such as rock wool, slag wool, glass fibers or asbestos fibers.

The fiber fleeces may be prepared in various ways, as for example by carding. In this way a fleece is obtained in which the fibers lie in a preferred direction. In order to increase strength, a plurality of such fleeces with preferably parallelly directed fibers can be laminated in such a way that the fibers in successive layers run in directions at an angle to each other. Tangled fiber fleeces with entirely random position of the fibers can also be prepared, or the fibers can be suspended in water in a process analogous to that used for the production of paper, and the fleece formed by sucking off the water on a sieve.

The fleece is preferably consolidated by spraying or soaking with an aqueous dispersion of the binding agent. For example the fleece may be led through an impregnating bath and the excess of the dispersion squeezed out between two rollers. Since the fibrous fleece has initially only a slight strength, it is often very difficult to lead it through the impregnating bath without it being torn. Therefore it is preferable, before the actual impregnation, to effect a preliminary consolidation superficially without the use of appreciable tension. An advantageous method of completing the bonding of such preliminary compacted fleeces comprises leading two fleeces between two rollers, supplying the binding agent between the fleeces and pressing it in by means of the rollers under light pressure. This avoids the disadvantage—occurring in the normal method—of the impregnated and still moist fleece sticking to the squeeze rollers with the result that fibers are torn out from the not yet bonded surface.

It is however also possible to use the copolymers dissolved in organic solvents or as solid products. Solid products are preferably strewed uniformly on the fiber fleece by means of a metering device.

The fibrous masses containing binding agent are then kept for some time, in general 3 to 10 minutes, at temperature above about 60° C. The binding agent is thereby converted into the insoluble state with a diminution of its thermoplastic properties. Thermal treatment is sufficient of itself to effect the conversion into the insoluble state. The heating period can however be shortened by adding to the binding agent compounds which accelerate the reaction, as for example acids or compounds yielding acids, such as phosphoric acid, paratoluenesulfonic acid, acetic acid, aluminum chloride, ammonium nitrate, ammonium chloride or ammonium oxalate. Fleeces which have been treated with solid pulverulent binding agents can be bonded under light pressure and at elevated temperature so that the setting of the fibers and the conversion of the binding agent into the insoluble state can be effected in one operation. Fleeces which have been treated with aqueous dispersions are preferably first dried at moderate temperatures, in general between 60° and 100° C., during which treatment the binding agents already begin clearly to crosslink. The binding agents are converted into the insoluble state by a heat treatment, preferably at 80° to 160° C. To modify the handle of the bonded fleece or the viscosity of the aqueous dispersions, it may be desirable to incorporate natural products, condensation products or dispersions of other copolymers. If the natural substances are water-soluble but have reactive groups in the molecule, they enter into the crosslinking reaction. If too large a quantity of these water-soluble products are present in the binding agent provided, it is preferable also to co-employ crosslinking hardenable synthetic resins. The same is obviously true of the introduction of any plastic dispersions or plastic solutions of which the films are not stable in washing at the boil and to organic solvents in the same way as the binding agents according to this invention.

It is furthermore possible to incorporate fillers into the binding agents, and special effects can thereby be obtained. For example the surface of a fleece which in itself is irregular can be rendered smooth by filling up the interstices between the fibers with bound pigment particles so that a surface is formed which lends itself for printing. By incorporating soluble dyestuffs or color pigments, colored fleeces can be prepared in a simple way. It is also possible to add optical brightening agents, plasticizers, stabilizers, thickening agents or fillers.

Fleeces bonded by means of a binding agent according to this invention are characterized by extraordinary stability to water and organic solvents even at elevated temperatures. By reason of the reduced thermoplasticity, the binding agent moreover has a very good thermal stability. At the same time the elasticity of the product is improved. The end products are rubber-elastic. When suitable co-monomers for the N-methylol compounds of the unsaturated carboxylic acid amides are chosen, products are obtained which are not subject to any aging phenomena whatever and which above all are very stable to light.

The fiber fleeces prepared according to the process of this invention may be used in many fields in practice. Examples are as filter cloths, separator walls, padding material, linings, filling material, clothing material, bags for silicic acid, hand cloths, cleaning cloths, medicinal cloths, packing and insulating material.

The following examples will further illustrate this invention but the invention is not restricted to these examples. The parts specified in the examples, unless otherwise stated, are parts by weight.

*Example 1*

A polyester fiber fleece (about 60 grams per square meter) is impregnated in an immersion bath with a 15% aqueous dispersion of a copolymer of 95 parts of butyl acrylate and 5 parts of methylolmethacrylamide. The excess is then squeezed off between two rollers. The fleece is dried at an initial temperature of about 60° C. Towards the end of the drying process, the temperature is gradually raised to 150° C. and the fleece exposed to this temperature for about 3 minutes. There results a white soft rubber-elastic fiber fleece. The content of binding agent is about 40% by weight with reference to the weight of the raw fleece.

A part of the impregnated fleece is led through a second bath comprising a melamine-urea precondensate as a 10% aqueous solution and ammonium oxalate in an amount of 5% with reference to the melamine resin. The fleece which has already been consolidated with the copolymer takes up a further 10% by weight of resin. The surface of the fleece is stiffened in handle by this aftertreatment.

The fleece is subjected to washing at the boil and also to a treatment in trichlorethylene. The loss in binding agent is less than 5% after rolling for two hours in trichlorethylene and washing at the boil for an hour. The binding agent is only slightly swollen during the cleaning process. The strength of the fleece is also substantially retained when it is brought to temperatures of 90° C.

*Example 2*

A mixed fiber fleece (wool, cotton and polyamide fibers) is impregnated by a dipping process. The impregnation mixture consists of the following components:

100 parts of a 10% aqueous dispersion of a copolymer of 98 parts of butyl acrylate and 2 parts of methylolmethacrylamide
20 parts of a 5% solution of potato starch in water
1 part of dimethylolurea dimethyl ether and
0.1 part of a 10% aqueous solution of a salt of an alkylnaphthalene sulfonic acid.

The mixture is adjusted to a pH value of about 8 with ammonia. The impregnated fleece, after squeezing, is dried at about 60° C. and then aftertreated for 10 minutes at 150° C. The fleece has absorbed about 30% of binding agent. It has a very good fastness to washing and cleaning. A slight finishing effect is achieved by the additions.

*Example 3*

A cotton fleece is sprayed on both sides with a 20% aqueous dispersion of a copolymer derived from 45 parts of styrene, 50 parts of butyl acrylate and 5 parts of methylolmethacrylamide and, after drying, dipped in a 10% dispersion of the same copolymer. The excess of impregnating liquid is squeezed off and the fleece dried, beginning at a temperature of 60° C. The temperature is raised to 150° C. during the drying process and kept there for 3 minutes. The fleece has absorbed about 50% of its original weight of binding agent (100%). The end product is a fleece which has been consolidated and at the same time finished. The stability to organic solvents and to washing at the boil is extremely good.

*Example 4*

A cotton fleece is led through an immersion bath containing the following impregnation mixture:

100 parts of a 40% aqueous dispersion of a copolymer derived from 93 parts of butyl acrylate, 5 parts of methylolacrylamide and 2 parts of acrylic acid,
135 parts of china clay,
5 parts of titanium dioxide (rutile type) and
2 parts of a 10% aqueous solution of an ammonium salt of a low-viscosity polyacrylic acid.

The pigments are first made into a paste with the above-mentioned ammonium salt of a low-viscosity polyacrylic acid and a little water. Then the plastic dispersion is slowly added in a mixing aggregate. The pigmented composition is then diluted to a solids content of 10%. The fleece treated with the said impregnation liquid has absorbed about 40% of its weight after drying. It is then smoothed between calender rollers at slightly raised temperature and slight pressure. The smoothing may also be directly annexed to the drying process. The drying heat is then utilized and the fleece while still hot is brought between two cooled pressure rollers. The surface of the fleece thereby becomes capable of being printed well. The fleece is suitable, inter alia, for the production of bags for drying agents.

What we claim is:

1. A method of producing bonded fiber fleeces which comprises: contacting a fiber fleece with an aqueous dispersion of a water-insoluble copolymer of (*a*) 1 to 20% by weight of an unsaturated carboxylic acid amide substituted on nitrogen by at least one methylol group, and (*b*) 80 to 99% by weight of another ethylenically unsaturated polymerizable compound; and heating said fiber fleece containing said water-insoluble copolymer as a binding agent at a temperature between 60° C. and 160° C.

2. A method as claimed in claim 1 wherein the fiber fleece is contacted with an aqueous dispersion of the water-insoluble copolymer of N-methylol acrylamide and an acrylic ester.

3. A method as claimed in claim 2 wherein the acrylic ester is butyl acrylate.

4. A method as claimed in claim 1 wherein the fiber fleece is contacted with an aqueous dispersion of the water-insoluble copolymer of N-methylol methacrylamide and an acrylic ester.

5. A method as claimed in claim 4 wherein the acrylic ester is butyl acrylate.

References Cited in the file of this patent

UNITED STATES PATENTS

| | | |
|---|---|---|
| 2,680,110 | Loughran et al. | June 1, 1954 |
| 2,718,515 | Thomas | Sept. 20, 1955 |
| 2,923,653 | Matlin et al. | Feb. 2, 1960 |
| 2,931,749 | Kine et al. | Apr. 5, 1960 |
| 2,955,958 | Brown | Oct. 11, 1960 |
| 2,984,588 | Granlich et al. | May 16, 1961 |
| 3,007,887 | Essig | Nov. 7, 1961 |